United States Patent [19]

LeBarny et al.

[11] Patent Number: 5,314,939

[45] Date of Patent: May 24, 1994

[54] AMORPHOUS COPOLYMERS FOR PHOTOREFRACTIVE COMPOUNDS USED IN OPTICAL SIGNAL PROCESSING

[75] Inventors: Pierre LeBarny, Orsay; Dominique Broussoux, Marcoussis; Jean-Claude DuBois, St. Remy Les Chevreuses, all of France

[73] Assignee: Thomson-CSF, Puteaux, France

[21] Appl. No.: 937,719

[22] Filed: Oct. 6, 1992

Related U.S. Application Data

[62] Division of Ser. No. 734,673, Jul. 23, 1991, Pat. No. 5,198,514.

[30] Foreign Application Priority Data

Jul. 31, 1990 [FR] France ............... 90 09740

[51] Int. Cl.[5] ........................... C08L 39/04
[52] U.S. Cl. .................. 524/241; 524/548; 524/544; 524/547; 252/582
[58] Field of Search ........... 524/241, 259, 548; 252/582

[56] References Cited

U.S. PATENT DOCUMENTS

| 4,867,538 | 9/1989 | Yoon et al. ............ 252/299.01 |
| 4,898,691 | 2/1990 | Borzo et al. ............ 252/589 |
| 5,185,102 | 2/1993 | Harelstad et al. ............ 252/582 |

FOREIGN PATENT DOCUMENTS

| 0244288 | 11/1947 | European Pat. Off. . |
| 0090282 | 10/1983 | European Pat. Off. . |
| 0240276 | 10/1987 | European Pat. Off. . |
| 0260687 | 3/1988 | European Pat. Off. . |

OTHER PUBLICATIONS

Williams, D. J. (1984) Angew. Chem. Int. Ed. Engl. 23, 690-703, "Organic Polymeric and Non-Polymeric Materials with large Optical Nonlinearities".
S. Ducharme et al., (1991) Phys. Rev. Lett. 66 (14), 1846-1849 (Apr. 8, 1991) "Observation of the Photo refractive Effect in a Polymer".
D. DC. Bradley et al., (1991) Phys. Rev. Lett. 67 (18), 2589 (Oct. 28 1991) "Comment on observation . . .".
S. Ducharme et al. (1991) Phys. Rev. Lett. 67 (18) 2590 (Oct. 28, 1991)"Reply to Comment".
R. P. Feynman et al., Feynman Lectures on Physics, vol. 1 33-3-33-6 Addison-Wesley, Reading MA, 1963.

Primary Examiner—Joseph L. Schofer
Assistant Examiner—Mark Nagumo
Attorney, Agent, or Firm—Oblon, Spivak, McClelland, Maier & Neustadt

[57] ABSTRACT

The invention is a series of amorphous copolymers which, used in association with a small molecule, provide photorefractive materials that can be used in optical signal processing. These copolymers contain an active non-linear optical group and a group which contributes to their photoconductivity.

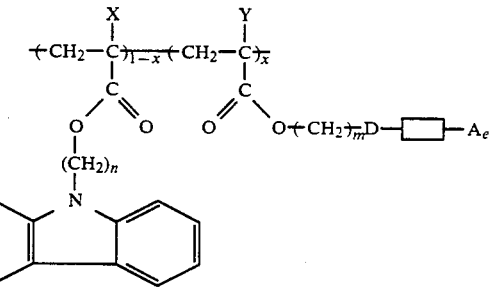

where:
X is H, $CH_3$, Cl or F
Y is H, $CH_3$, Cl or F
$2 \leq n \leq 4$
$2 \leq m \leq 4$
The electron-donor group D being: —O—, —S—, (Abstract continued on next page.)

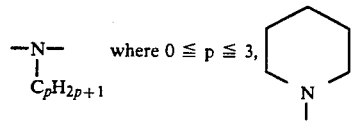 where $0 \leq p \leq 3$,
or —COO—
The electron-accepter group $A_e$ being: —CN, —NO$_2$,
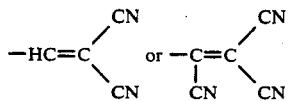
3 Claims, 3 Drawing Sheets WHERE:
X IS H, CH$_3$, Cl OR F
Y IS H, CH$_3$, Cl OR F
$2 \leq n \leq 4$
$2 \leq m \leq 4$
THE ELECTRON-DONOR GROUP D BEING: ---O---, ---S---,
---N--- WHERE $0 \leq p \leq 3$.
C$_p$PH$_{2p+1}$
THE ELECTRON-ACCEPTER GROUP A$_e$ BEING: ---CN, ---NO$_2$,  or ---COO---

REPRESENTING A SYSTEM RICH IN π-CONJUGATED ELECTRONS:

WHERE $1 \leq y \leq 3$ or or

AMORPHOUS COPOLYMERS FOR PHOTOREFRACTIVE COMPOUNDS USED IN OPTICAL SIGNAL PROCESSING

This is a division, of application Ser. No. 07/734,673, filed on Jul. 23, 1991, now U.S. Pat. No. 5,198,514.

BACKGROUND OF THE INVENTION

1. Field of the invention

The invention consists of copolymers associated with certain small molecules which form photorefractive compounds usable in optical signal processing. More specifically, it concerns new families of amorphous polymers whose lateral chains contain chromophoric groups capable of generating non-linear optical effects and electron-donor groups which, associated with electron-accepter groups, give the material its photoconductive properties.

A material is said to be "photorefractive" when illumination generates remanent variations in the refractive index. When an electric potential is applied to these materials and they are exposed to incident distributed luminosity, variations in the refractive index occur in the dark, isolating section while this variation tends towards zero in conductive illuminated zones where charge migration cancels out the voltage. When the illumination stops, the material returns to the initial situation except close to the boundary: the dielectric on the illuminated side of the boundary is depleted in photon-carriers which have migrated a certain distance and become trapped in the dark area. At the boundary, the space charges created form a local field which results in a local variation in the refractive index. This variation remains throughout the period required for dielectric relaxation of the material (several months in the case of compounds such as lithium niobate).

2. Description of the prior art

The photorefractive effect therefore records a spatial variation and is used in applications such as:
- the recording of volumetric holographic networks
- experiments in dynamic interferometry
- image processing
- the deflection of laser beams
- optical amplification
- auto-resonant cavities
- optical calculation (for association memories, elementary logic components, reconfigurable interconnections).

At present, most photorefractive materials are inorganic compounds such as:
- ferroelectric crystals, for example $LiNbO_3$, $BaTiO_3$
- sillenites such as bismuth and silicon or germanium oxide crystals ($Bi_{12}SiO_{20}$ or $B_{12}GeO_{20}$)
- III-V compounds (GaAs doped with Cr, InP doped with Fe).

However, these materials present certain disadvantages which impede further development: the compounds which offer the best performance are not available as large monocrystals and they are still very expensive. In addition, at present, none of these materials offer the qualities required, which are very fast response, high sensitivity and large memory capability.

In parallel with the development of these inorganic photorefractive compounds, organic materials, particularly polymers, have been found to possess promising properties:

for non-linear optical applications. Since the beginning of the 1980s, work on amorphous polymers doped with highly hyperpolarizable molecules and then amorphous copolymers in which the chromophoric molecules are directly bonded have shown that the electrooptical properties that could be obtained were comparable with those of inorganic compounds (U.S. Pat. Nos. 4,828,865 and 4,808,332, taken out by HOECHST CELANESE, the applicant's European patents EP 88 0579 and EP 89 11327).

in photoconductive applications. These polymers can possess conjugated multiple bonds as in polyacetylenes and trans polyphenylacetylenes. They can include aromatic groups consisting of several benzene cores, either in the structure or in the lateral chains, for example derivatives of anthracene, pyrene or acridine. They can also possess aromatic amine functions like, for example, polyvinylcarbazole (PVK). PVK doped with 2, 4, 7 trinitro-9-fluorenone (TNF) is commercially available and has practical applications in the reproduction of documents (Xerography). These polymer materials are also generally easy to work and can be used to produce large surfaces at far less cost than inorganic materials.

SUMMARY OF THE INVENTION

Consequently, this invention proposes a series of amorphous copolymers with properties which are advantageous both in non-linear optics and in photoconductivity and can be used to produce organic photorefractive materials for optical applications, particularly optical signal processing. These amorphous copolymers with lateral chains comprise:
- a group with a high $\beta$ hyperpolarizability value to generate strong non-linear optical effects, molecular engineering making it possible to adjust this hyperpolarizability and the transparency of the material to suit the wavelength used
- an electron-donor group which, in conjunction with a small electron-accepter molecule, makes the copolymer photoconductive.

Preferably, these copolymers comply with the following chemical formula:

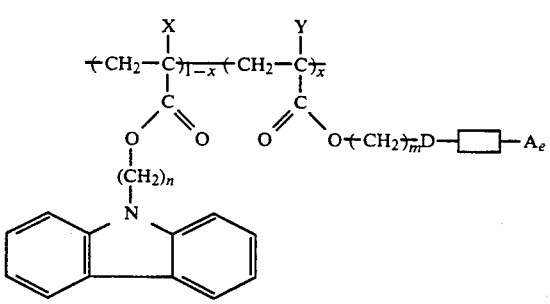

where:
X is H, $CH_3$, Cl or F
Y is H, $CH_3$, Cl or F
$2 \leq n \leq 4$
$2 \leq m \leq 4$
The electron-donor group D being: —O—, —S—,

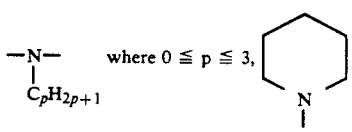 where $0 \leq p \leq 3$, or —COO—

The electron-accepter group $A_e$ being: —CN, —NO$_2$

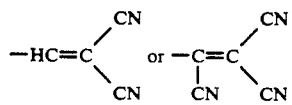

representing a system rich in π-conjugated electrons:

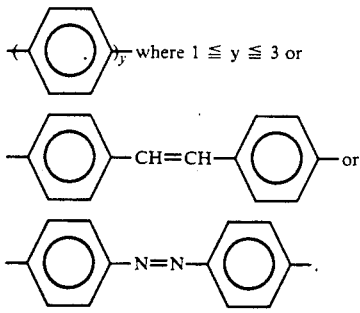

This invention is also a photorefractive mixture obtained by introducing a small electron-accepter molecule into a copolymer complying with the invention; this molecule may be 2, 4, 7 trinitro-9-fluorenone.

Finally, the invention includes the use of this organic mixture in any device which uses the photorefractive effect.

The invention will be better understood, and other advantages will become clear, upon reading the following description, which is not exhaustive, and by studying the appended figures including:

DETAILED DESCRIPTION OF THE INVENTION

In general, copolymers complying with the invention are preferably produced by radical polymerization using azobisisobutyronitrile (AIBN) as a starter and dimethylformamide as a solvent at 60° C. for twenty four hours. The copolymer is precipitated in ethanol.

The colorant content is determined by visible UV spectrometry. A precise example of the synthesis of a copolymer complying with the invention and its non-linear optical and photoconductive properties are given below:

synthesis of poly [N (methacryloyloxyethyl) carbazole co 4 (N methacryloyloxypropylamino) nitrobenzene)].

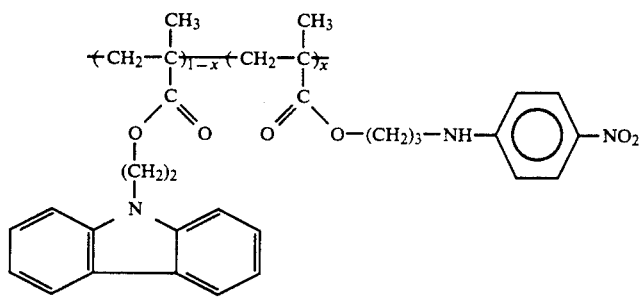

Figure 1:
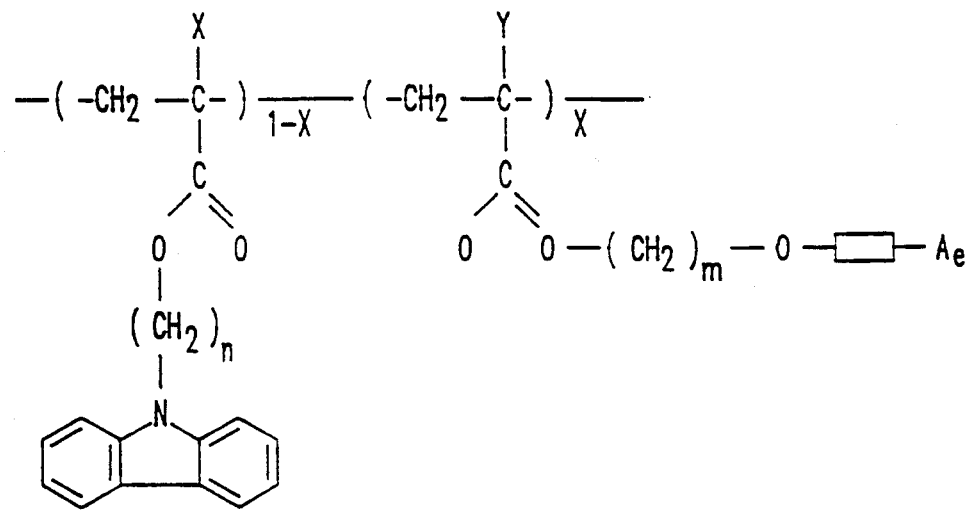
FIG. 1, showing a family of copolymers complying with the invention.
Figure 1:
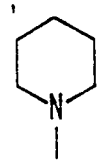
Figure 1:
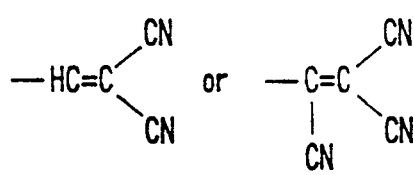
Figure 1:
Figure 1:
Figure 1:
Figure 1:
Figure 2:
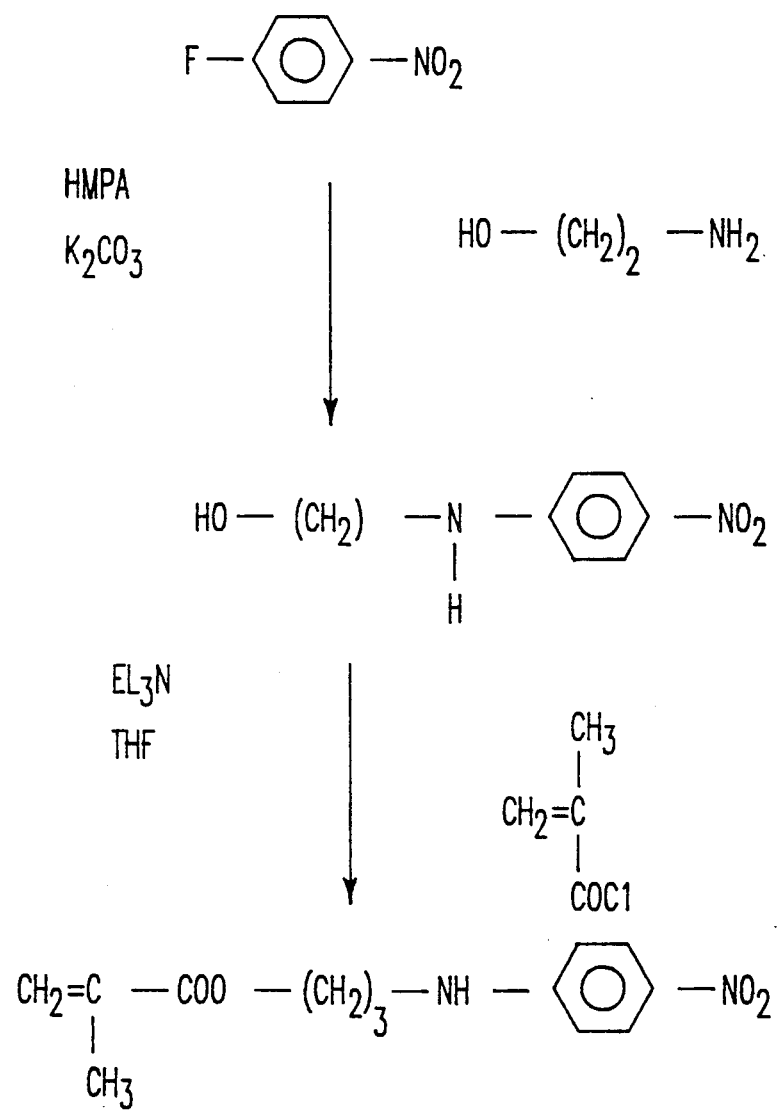
FIG. 2, showing a reaction diagram of the synthesis of the colorant monomer in one example of a copolymer complying with the invention, FIG. 3, showing a reaction diagram of the synthesis of the monomer with an electron-donor group in an example of a copolymer complying with the invention.

1) The colorant monomer 4'(N-methacryloyloxypropylamino) nitrobenzene is synthesized from 4 fluoronitrobenzene in 2 stages as represented by the reaction diagram in FIG. 2. The experimental details are described in patent 89 11327 deposited by the applicant.

Figure 3:
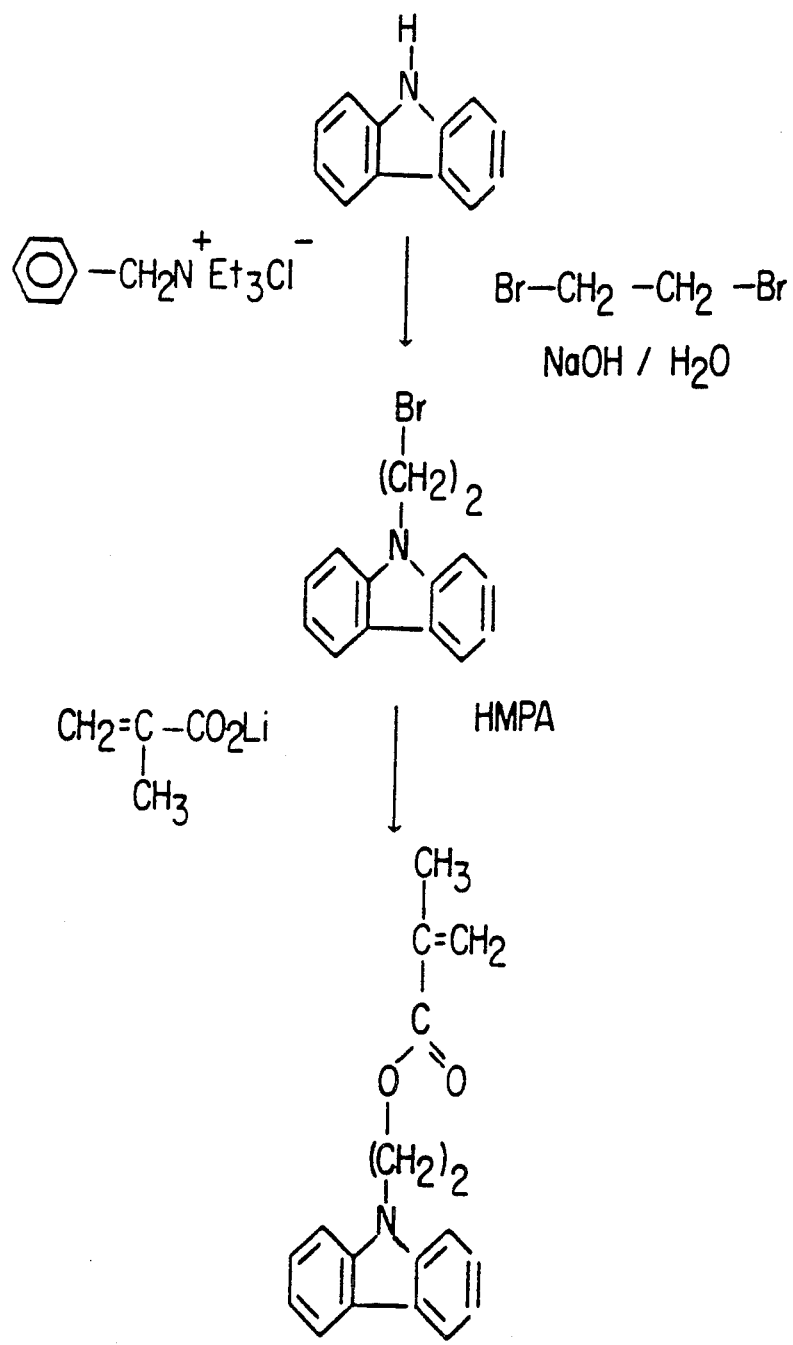

2) The monomer N methacryloyloxyethyl carbazole is synthesized from carbazole in 2 stages as represented in the reaction diagram in FIG. 3:

1st stage: synthesis of N (2 bromoethyl) carbazole.

74 ml of 50% sodium hydroxide solution is prepared in a 500 ml receptacle. 83 ml of 1,2 dibromoethane (0.96 moles), 10 g of carbazole (0.06 moles) and 1.72 g of benzyltriethylammonium chloride are added. The mixture is heated to 70° C. for 10 hours with strong agitation. The contents are poured from the first receptacle into a second receptacle containing a mixture of water and hexane. The raw product precipitates and is separated by filtration. To eliminate any carbazole which has not taken part in the reaction, the solid obtained is placed in chloroform and agitated. After filtration through sintered glass, the filtrate recovered is evaporated then recrystallized in ethanol. The melting point of the small beige needles obtained is 140° C. The reaction yield is 35%.

2nd stage: synthesis of N (methacryloyloxyethyl) carbazole.

5 g of N bromoethyl carbazole (0.018 moles) is placed in a 50 ml receptacle and 25 ml of hexamethylphosphortriamide (HMPA) is added. The mixture is agitated until the N bromoethyl carbazole is completely dissolved. The next step is to add 3.35 g of lithium methacrylate (0.036 moles) and 0.2 g of hydroquinone to avoid polymerization. The mixture is then agitated for 24 hours at 40° C. When poured into water, the reaction mixture gives a white precipitate which is filtered out through sintered glass and then washed with water and hexane to remove excess lithium methacrylate, HMPA and hydroquinone.

This gives a white powder which is purified by chromatography using toluene as the eluant. It is then recrystallized in ethanol. The reaction yield is 45% and the product obtained has a melting point of 84° C.

3) Copolymer synthesis 3.14 mg of AIBN, 1.41 g (5.05 moles) of N methacryloyloxyethyl carbazole, 0.608 g (2.30 moles) of 4 (N methacryloyloxypropylamine) nitrophenyl and 20 ml of dimethylformamide (DMF) are placed in a previously-sealed ampoule. This reaction medium is frozen in liquid air then placed under vacuum. It is allowed to return to ambient temperature and the above operation is repeated twice. Finally, the ampoule is sealed under vacuum and heated to 60° C. for 24 hours. The copolymer is precipitated in ethanol. The copolymerization yield is 61.5%. The colorant content is determined by visible UV spectrometry: $x=0.237$.

The copolymer vitreous transition temperature is 136.5° C.

When dissolved in 1,1,2 trichloroethane, this copolymer allows thin films to be produced easily.

The copolymer film is dried under vacuum at 120° C. and oriented by a steady electric field. This field is created by ionizing the air feed from a metal tip at very high voltage (4 kV) using the corona method.

Polarized in this way, the polymer doubles the frequency of a YAG laser operating at 1.06 μm. The $d_{33}$ factor measured is 3 pm $v^{-1}$ (identical to that obtained with BSO (bismuth silicon oxide)).

This same copolymer, when doped with 20% TNF, gives a film which, after orientation by the corona method (V=4 kV), doubles the frequency of a YAG laser ($\lambda=1.06$ μm) with $d_{33}=4$ pm $V^{-1}$.

This copolymer, doped with 20% TNF, and placed between glass coated with ITO (a mixture of indium and tin oxides) and a chrome-gold electrode has photoconductive properties.

In fact, the β sensitivity, defined by the following equation:

$$\sigma = \sigma_o + \beta I$$

where
- $\sigma$ = conductivity when illuminated
- $\sigma_o$ = conductivity in the dark
- $I$ = intensity of the luminous flux is approximately $0.5 \ 10^{-10} \Omega^{-1}$ cm $W^{-1}$ for a 514 nm incident wavelength. This β coefficient is approximately $10^{-9} \Omega^{-1}$ cm. $W^{-1}$ for polysilanes and approximately $10^{-7} \Omega^{-1}$ cm. $W^{-1}$ for the BSO photorefractive crystal.

These electroactive and photoconductive copolymers can be optimized by carefully selecting the chromophoric and photoconductive groups, their relative proportions and, above all, by using these materials at the wavelength for which they were optimized.

What is claimed is:

1. A photorefractive mixture of organic compounds consisting of an amorphous copolymer for photorefractive compounds having the following chemical formula:

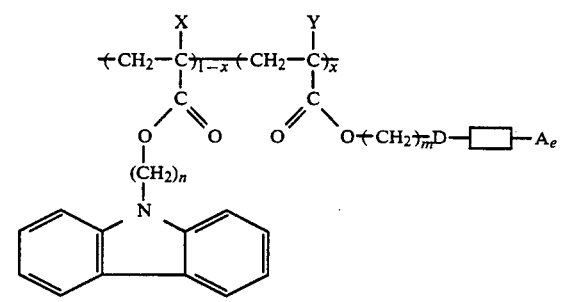

where:
- X = H, CH₃, Cl or F
- Y = H, CH₃, Cl or F
- $2 \leq n \leq 4$
- $2 \leq m \leq 4$
- D is an electron donor group being —O—, —S—,

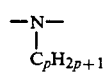

where $0 \leq p \leq 3$, or —COO—

$A_e$ is an electron-acceptor group being —CN, —NO₂,

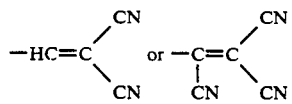

is a system rich in π conjugated electrons:

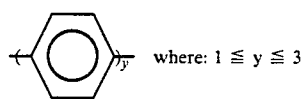  where: $1 \leq y \leq 3$

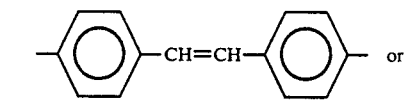

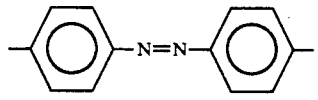

and a small electron-acceptor molecule C, the molar ratio of electron donor groups D to small electron-acceptor molecules C being between 0 and 1.

2. The photorefractive mixture described in claim 1 in which the small electron-acceptor molecule is 2,4,7 trinitro-9-fluorenone.

3. An optical device which uses the photorefractive mixture described in claim 1 or claim 2.

* * * * *